A. SIMON.
MOTOR CONTROLLER.
APPLICATION FILED MAY 20, 1914.
1,299,248.
Patented Apr. 1, 1919.
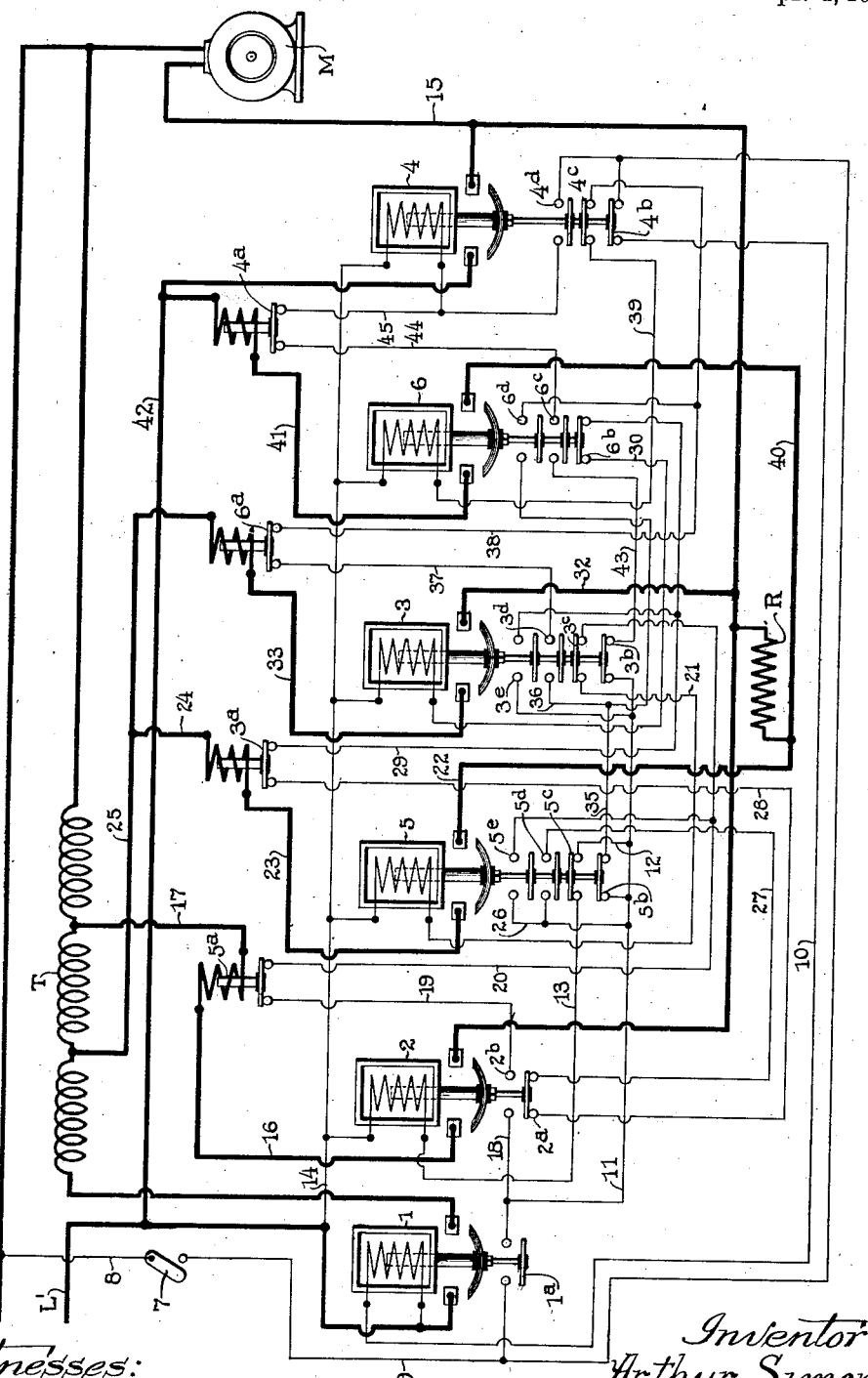
Witnesses:
George Haynes
J. L. Johnson
Inventor:
Arthur Simon
By Frank M. Hubbard
Attorney.

UNITED STATES PATENT OFFICE.

ARTHUR SIMON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,299,248.  Specification of Letters Patent.  Patented Apr. 1, 1919.

Application filed May 20, 1914. Serial No. 839,795.

*To all whom it may concern:*

Be it known that I, ARTHUR SIMON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to motor controllers and is particularly applicable to potential controllers for alternating current motors, such, for example, as the controller disclosed in my prior Patent No. 985,215, granted Feb. 25, 1911.

The invention has among its objects to provide a multiple switch potential controller for alternating current motors which will maintain continuity of the motor circuit during the regulation of potential.

A further object is to provide a controller of the aforesaid character with means to arrest the operation of the potential regulating switches upon the occurrence of abnormal conditions in the motor circuit.

Various other objects and advantages of the invention will hereinafter appear.

To more clearly and fully disclose the nature and advantages of the present invention, one embodiment thereof has been diagrammatically illustrated in the accompanying drawing, it, of course, being understood that various modifications may be made in the controller illustrated without departing from the scope of the appended claims.

The controller is illustrated as governing a single phase alternating current motor M through the medium of an auto-transformer T. Briefly described, the controller includes a plurality of electromagnetic switches operating in progression to first connect the auto-transformer T in circuit and then connect the motor to different taps of the transformer; and upon changing from each tap to the next, establishing connections to maintain continuity of the motor circuit in the interim. Also, current relays are provided to check the progressive operation of the switches whenever the current in the motor circuit exceeds a certain value.

More specifically, the controller includes a magnetic switch 1 controlling the circuit of the transformer T, magnetic switches 2, 3 and 4 to progressively connect the motor to different taps of the transformer and directly to the line, magnetic switches 5 and 6 to establish transition connections for the motor and current relay switches $3^a$, $4^a$, $5^a$ and $6^a$ controlling the energizing circuits of the switches 3, 4, 5 and 6 respectively.

The switches 1, 2, 5, 3, 6 and 4 are interconnected through auxiliary contacts hereinafter described to respond in the order named upon closure of a control switch 7 and to thereafter act as follows: The switch 1 remains closed until operation of switch 4. The switch 2, connecting the motor to the first tap of the transformer, opens prior to closure of the switch 3, connecting the motor to the second tap of the transformer and the switch 3 in turn opens prior to response of the switch 4, which connects the motor directly to the line. The switch 2, however, remains closed until response of the switch 5, which latter switch connects the second tap of the transformer to the motor through a resistance R. Switch 5 remains closed until response of the switch 3 and then automatically opens. The switch 6 functions with respect to the switches 3 and 4 in the same manner as switch 5 functions with respect to the switches 2 and 3. Thus, in the interval between the opening of the switch 2 and the closure of the switch 3 the continuity of the motor circuit is maintained by the switch 5 through the resistance R, and likewise during the interval between the opening of switch 3 and the closure of switch 4 the continuity of the motor circuit is maintained by the switch 6 through the resistance R.

The current relay $5^a$ is connected in circuit upon closure of switch 2 and upon response delays closure of the energizing circuit of switch 5 until normal current conditions are restored in the motor circuit. Then when the switch 5 responds and the switch 2 opens, the winding of said relay is disconnected from circuit. The relays $3^a$, $6^a$ and $4^a$ are similarly controlled by the switches 5, 3 and 6 respectively to govern the operation of switches 3, 6 and 4 in the manner described.

The circuit arrangement and operation of the controller will now be more specifically described. When switch 7 is closed circuit is completed from line L by conductor 8 through said switch, by conductor 9 through down contacts $4^b$ of switch 4, by conductor 10 through the winding of switch 1 to line L'. Switch 1 thereupon responds, connecting the transformer T directly across the supply lines L and L'. At the same time, switch 1 completes circuit from conductor 9 through its auxiliary contacts 1ª, by conductors 11 and 12 through down contacts 5ᶜ of switch 5, by conductor 13 through the operating winding of switch 2, to conductor 14 and thence to line L'. Switch 2 thereupon responds, connecting the motor in circuit.

The motor is permanently connected to line L and upon response of switch 2 it is also connected by conductor 15 through switch 2, by conductor 16 through the winding of relay 5ª, by conductor 17 to the right hand tap of the transformer. It is thereby started but with a low potential impressed thereon.

Switch 2 upon responding, also completes circuit from conductor 11 by conductor 18 through a set of up contacts 2ᵇ, by conductor 19 through relay switch 5ª, by conductor 20 through down contacts 3ᶜ of switch 3, by conductor 21 through the winding of switch 5 to conductor 14 and thence to line L'. Switch 5 thereupon responds subject to retardation by response of relay switch 5ª.

Switch 5 when closed establishes a connection for the motor from conductor 15 through resistance R, by conductor 22 to conductor 23 through the winding of relay 3ª, by conductors 24 and 25 to the second tap of the transformer. This constitutes one of the temporary connections for the motor, and as soon as the same is established the switch 2 is deënergized by the opening of the auxiliary contacts 5ᶜ of switch 5. This leaves the motor with only the temporary connection aforesaid, the switch 5 being maintained closed by its auxiliary contacts 5ᵉ in parallel with contacts 2ᵇ of switch 2.

Switch 2 upon opening completes the energizing circuit of switch 3. This circuit extends from conductor 11 by conductor 26 through up contacts 5ᵈ of switch 5, by conductor 27 through down contacts 2ª of switch 2, by conductor 28 through the relay switch 3ª, by conductor 29 through down contacts 6ᵇ of switch 6, by conductor 30 through the winding of switch 3 to conductor 14 and thence to line L'.

Switch 3 thus responds subject to retardation by relay 3ª and upon responding connects the motor lead 15 by conductor 32 to conductor 33 through the winding of relay 6ª to tap lead 25. It therefore excludes from the motor circuit the resistance R. Also, switch 3 by the opening of its auxiliary contacts 3ᶜ deënergizes switch 5 while by the closure of its auxiliary contacts 3ᵉ parallels the contacts 5ᵈ and thus establishes a maintaining circuit for itself. Further, by closure of contacts 3ᵇ it completes the energizing circuit of switch 6, assuming the switch 5 to be returned to normal position to close its contacts 5ᵇ.

The energizing circuit of switch 6 extends from conductor 11 through the down contacts 5ᵇ of switch 5, by conductors 35 and 36 through up contacts 3ᵈ of switch 3, by conductor 37 through relay switch 6ª, by conductor 38 through down contacts 4ᶜ of switch 4, by conductor 39 through the winding of switch 6 to conductor 14 and thence to line L'. Switch 6 thereupon responds, subject to retardation by relay 6ª and upon responding connects the motor lead 15 through resistance R by conductor 40 to conductor 41, through the winding of relay 4ª by conductor 42 to line L'. This, as will be understood, constitutes another temporary connection and as soon as the same is established switch 3 is deënergized by the opening of the down contacts 6ᵇ of switch 6. Switch 6 is maintained closed by the up contacts 6ᵈ and when switch 3 opens the circuit of switch 4 is closed through the down contacts 3ᵇ of switch 3 and the up contacts 6ᶜ of switch 6.

The circuit of switch 4 extends from conductor 11 through said contacts 3ᵇ, by conductor 43 through said contacts 6ᶜ, by conductor 44 through relay switch 4ª, by conductor 45 through the winding of switch 4 to conductor 14 and line L'. Switch 4 thereupon responds, subject to retardation by the relay 4ª and upon closing completes circuit directly from conductor 42 to motor lead 15 for maximum potential.

Switch 4 when closed also establishes a maintaining circuit for itself through up contacts 4ᵈ and by opening of down contacts 4ᵇ and 4ᶜ deënergizes switches 1 and 6 respectively. The motor is thus connected directly across the lines by a single switch and all remaining switches are opened.

What I claim as new and desire to secure by Letters Patent is:

1. In a controller for alternating current motors, the combination with a transformer, of a plurality of separately actuated switches automatically operable in progression, a resistance, the first switch of the progression completing circuit to one tap of the transformer, the second completing circuit to another tap of the transformer through said resistance and the third completing a circuit for the latter tap exclusive of said resistance.

2. In a controller for alternating current motors, the combination with a transformer, of a plurality of separately actuated switches automatically operable in progression, a resistance, the first switch of the progression completing circuit to one tap of the transformer, the second completing circuit to another tap of the transformer through said resistance and the third completing a circuit for the latter tap exclusive of said resistance, and means to check the progressive operation of said switches under abnormal electrical conditions.

3. In a controller for alternating current motors, the combination with a transformer, of a plurality of separately actuated switches operable in progression, a resistance, the first switch of said progression completing circuit to one tap of the transformer, the second completing circuit to another tap of the transformer, through said resistance, and the third completing circuit to said second tap exclusive of said resistance, said first switch being restored to initial position upon operation of said second switch and said second switch being restored to initial position upon operation of said third switch.

4. In a controller for alternating current motors, the combination with a transformer, of a plurality of separately actuated switches operable in progression, a resistance, the first switch of said progression completing circuit to one tap of the transformer, the second completing circuit to another tap of the transformer, through said resistance, and the third completing circuit to said second tap exclusive of said resistance, said first switch being restored to initial position upon operation of said second switch and said second switch being restored to initial position upon operation of said third switch and means to check the progressive operation of said switches under abnormal electrical conditions.

5. In a controller for alternating current motors, in combination, a transformer, a plurality of switches operable in progression and each upon operating effecting restoration of the preceding switch to initial position, connections between alternate switches of the aforesaid progression and different taps of said transformer and resistance shunts around certain of said alternate switches controlled by the switches next preceding the same in the aforesaid progression.

6. In a controller for alternating current motors, in combination, a transformer, a plurality of switches operable in progression and each upon operating effecting restoration of the preceding switch to initial position, connections between alternate switches of the aforesaid progression and different taps of said transformer, a resistance, and connections whereby other switches of the aforesaid progression complete circuit to the different taps of the transformer through the aforesaid resistance for maintaining the continuity of the motor circuit during transition of connections by said first mentioned switches.

7. In a motor controller, in combination, a plurality of progressively operable potential regulating switches each to be restored to initial position prior to operation of the next switch in progression and a plurality of switches operable progressively and alternately with respect to said former switches to establish transition connections.

8. In a motor controller, in combination, a plurality of progressively operable potential regulating switches each to be restored to initial position prior to operation of the next switch in progression, a plurality of switches operable progressively and alternately with respect to said former switches to establish transition connections, and means responsive to the current in the motor circuit to check the operation of the aforesaid switches under abnormal conditions.

9. In a motor controller, in combination, a plurality of progressively operable potential regulating switches each to be restored to initial position prior to operation of the next in progression, a plurality of switches operable progressively and alternately with respect to said former switches to establish transition connections, and a plurality of devices responsive to the electrical conditions in the motor circuit, each of said devices upon responding temporarily checking the operation of one of said switches.

10. In a motor controller, in combination, a plurality of progressively operable switches, potential regulating means controlled by alternate switches of the aforesaid progression and transition connections controlled by other switches of the aforesaid progression, each of said switches returning to initial position upon operation of the next succeeding switch.

11. In a motor controller, in combination, a plurality of progressively operable switches, potential regulating means controlled by alternate switches of the aforesaid progression and transition connections controlled by other switches of the aforesaid progression, each of said switches returning to initial position upon operation of the next succeeding switch, and means responsive to the current conditions in the motor circuit to arrest the progressive operation of said switches under predetermined conditions.

12. In a motor controller, in combination, a plurality of potential regulating switches to operate in progression and each to return to initial position prior to operation of the next in progression and tending when opened to interrupt the motor circuit, and means for maintaining the continuity of the motor circuit during the intervals between the return of each of said switches and the operation of the following switch.

13. In a motor controller, in combination, a plurality of electro-responsive potential regulating switches operable in progression and each returning to initial position prior to operation of the next in progression, and electro-responsive means to establish temporary motor connections during the variations in connections by said switches.

14. In a motor controller, in combination, a plurality of electro-responsive potential regulating switches operating in progression and each returning to initial position prior to operation of the next in progression and means operating automatically prior to the return of each of said switches to establish temporary motor connections and upon operation of the following switch operating automatically to interrupt said temporary connections.

15. In a motor controller, in combination, a plurality of electro-responsive potential regulating switches operating in progression and each returning to initial position prior to operation of the next in progression, means operating automatically prior to the return of each of said switches to establish temporary motor connections and upon operation of the following switch operating automatically to interrupt said temporary connection, and means responsive to the current conditions in the motor circuit for arresting the progressive operation of said switches under abnormal conditions.

16. In a motor controller, in combination, a plurality of electro-responsive potential regulating switches operating in progression and each returning to initial position prior to operation of the next in progression and a plurality of electro-responsive switches to establish temporary connections for the motor, each of said second mentioned switches operating automatically upon operation of a corresponding potential regulating switch and returning to initial position upon operation of the next potential regulating switch.

17. In a controller for alternating current motors, in combination, a transformer, a plurality of switches operable automatically and progressively to connect said transformer in circuit, then establish motor connections to said transformer and finally to the line, means to establish temporary motor connections in the intervals between the establishment of the aforesaid connections, and means whereby the switch controlling the transformer circuit is restored to initial position upon establishment of the motor connections to the line.

18. In a motor controller, in combination, two electro-responsive control switches, one to close and open prior to the closure of the other and the former upon opening tending to interrupt the motor circuit, and electro-responsive means operating after closure of said first switch to maintain the continuity of the motor circuit in the interval between the opening of said first switch and the closure of said second switch.

19. In a motor controller, in combination, two electro-responsive control switches, one to close and open prior to the closure of the other and the former upon opening tending to interrupt the motor circuit, and electro-responsive means operating after closure of said first switch to maintain the continuity of the motor circuit in the interval between the opening of said first switch and the closure of said second switch, and operating automatically to interrupt said connection upon the closure of said second switch.

20. In a motor controller, in combination, three switches, means effecting automatic closure thereof progressively, opening of the first subsequent to closure of the second and opening of the second upon closure of the third and connections established by said second switch to maintain the continuity of the motor circuit during the change of connections by said first and third switches.

In witness whereof, I have hereunto subscribed my name in the presence of two witnesses.

ARTHUR SIMON.

Witnesses:
  C. T. EVANS,
  L. A. WATSON.